(12) United States Patent
Kirkpatrick

(10) Patent No.: US 10,017,887 B2
(45) Date of Patent: Jul. 10, 2018

(54) SYSTEM AND METHOD FOR MULTIPLE SURFACE WATER JET NEEDLING

(71) Applicant: Goodrich Corporation, Charlotte, NC (US)

(72) Inventor: Christopher T. Kirkpatrick, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 218 days.

(21) Appl. No.: 15/077,585

(22) Filed: Mar. 22, 2016

(65) Prior Publication Data

US 2017/0275795 A1  Sep. 28, 2017

(51) Int. Cl.
*D04H 18/04*  (2012.01)
*D04H 1/492*  (2012.01)

(52) U.S. Cl.
CPC ............ *D04H 18/04* (2013.01); *D04H 1/492* (2013.01)

(58) Field of Classification Search
CPC ...... D04H 18/04; D04H 1/4242; D04H 1/492; D04H 3/11; D04H 5/03; D04H 1/465; D04H 1/495; D04H 1/49; D04H 1/498; D04H 13/003; D04H 18/00; D04H 18/02; F16D 69/023; D01H 4/02
USPC .................................................. 28/104, 105
See application file for complete search history.

(56) References Cited

U.S. PATENT DOCUMENTS

| | | | | |
|---|---|---|---|---|
| 2,862,251 A * | 12/1958 | Kalwaites | ............... | D21F 11/00 162/114 |
| 3,110,151 A * | 11/1963 | Bunting, Jr. | .............. | D02J 1/08 28/258 |
| 3,747,161 A * | 7/1973 | Kalwaites | ................ | D04H 1/70 264/156 |
| 5,238,644 A * | 8/1993 | Boulanger | ............. | D04H 18/04 264/119 |
| 5,881,440 A * | 3/1999 | Deeming | ............... | D04H 18/04 28/104 |
| 6,009,605 A * | 1/2000 | Olry | ........................ | B29B 11/16 28/107 |
| 6,052,983 A * | 4/2000 | Moran | ................... | D02G 3/286 57/293 |
| 6,347,440 B1 * | 2/2002 | Duval | .................... | D04H 18/02 28/107 |
| 6,367,130 B1 * | 4/2002 | Duval | .................... | D04H 18/02 28/107 |

(Continued)

FOREIGN PATENT DOCUMENTS

| | | |
|---|---|---|
| EP | 0528336 | 2/1993 |
| EP | 1091028 | 4/2001 |
| FR | 2761380 | 10/1998 |

OTHER PUBLICATIONS

Extended European Search Report dated Jun. 13, 2017 in European Application No. 17159553.1.

*Primary Examiner* — Amy Vanatta

(74) *Attorney, Agent, or Firm* — Snell & Wilmer L.L.P.

(57) ABSTRACT

A water entanglement system having a first rotatable surface comprises a first water jet which may be configured to water-entangle a preform in situ. The water-entanglement system may comprise a second rotatable surface disposed proximate the first rotatable surface. The second rotatable surface may comprise a second water jet configured to water-entangle the preform in situ. The first rotatable surface may be oriented substantially parallel to the second rotatable surface.

8 Claims, 4 Drawing Sheets

(56) References Cited

U.S. PATENT DOCUMENTS

| | | | |
|---|---|---|---|
| 6,638,883 B2 | 10/2003 | Gaffney et al. | |
| 7,530,150 B2 * | 5/2009 | Brennan | D04H 18/04 |
| | | | 28/104 |
| 8,225,469 B2 * | 7/2012 | Bevan | D04H 1/4382 |
| | | | 28/104 |
| 8,721,954 B2 | 5/2014 | La Forest et al. | |
| 2002/0013111 A1 * | 1/2002 | Dugan | D01F 8/14 |
| | | | 442/335 |
| 2015/0354110 A1 * | 12/2015 | Linck | D04H 1/4242 |
| | | | 28/104 |

* cited by examiner

SYSTEM AND METHOD FOR MULTIPLE SURFACE WATER JET NEEDLING

FIELD

This disclosure generally relates to the needling of a fabric utilizing water jets.

BACKGROUND

Carbon/carbon ("C/C") parts are employed in various industries. C/C parts may be used as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat and thus is able to dissipate heat away from the braking surfaces that is generated in response to braking. C/C material is also highly resistant to heat damage, and is thus capable of sustaining friction between brake surfaces during severe braking, without a significant reduction in the friction coefficient or mechanical failure. Compared to other materials used for aircraft brakes, C/C composites offer significant weight savings.

SUMMARY

According to various embodiments, a water-entanglement system is described herein. The water-entanglement system may comprise a first rotatable surface. The first rotatable surface comprises a first water jet which may be configured to water-entangle a preform in situ. The water-entanglement system may comprise a second rotatable surface disposed proximate the first rotatable surface. The second rotatable surface may comprise a second water jet configured to water-entangle the preform in situ. The first rotatable surface may be oriented substantially parallel to the second rotatable surface.

The first water jet may be oriented towards the second rotatable surface. The second water jet may be oriented towards the first rotatable surface. The first rotatable surface and the second rotatable surface may bound a gap. The first rotatable surface and the second rotatable surface may bound the gap so that the gap is configured to increase as the preform expands in at least one of the positive and the negative Z direction.

The first rotatable surface and the second rotatable surface may be configured to rotate about a common axis substantially in unison. The preform may be an annular preform comprising of a plurality of layers. The water-entanglement system may comprise a first fabric source and a second fabric source. A first fabric from the first fabric source and a second fabric from the second fabric source may be combined to form the preform.

According to various embodiments, a water-entanglement system having a housing, a first rotatable surface disposed with the housing and a second rotatable surface disposed with the housing proximate the first rotatable surface is described herein. The first rotatable surface may comprise a first water jet configured to water-entangle a preform in situ. The second rotatable surface may be disposed with the housing proximate the first rotatable surface. The second rotatable surface may comprise a second water jet configured to water-entangle the preform in situ. The first rotatable surface may be oriented substantially parallel to the second rotatable surface.

According to various embodiments, a water-entanglement method comprising feeding a substantially continuous spiral fabric to a space defined by a first rotatable surface comprising a first water jet and a second rotatable surface comprising a second water jet. The method further comprises, growing a preform based on the feed of substantially continuous spiral fabric. Water is imparted to a surface of a preform from at least one of the first water jet or the second water jet, wherein the water entangles the preform.

In various embodiments, the water-entanglement method includes receiving the continuous spiral fabric from a first fabric source and a second fabric source. The first fabric source is at least one of a carbon fiber spiral manufacturing source or a helical fabric manufacturing source. Also, the second fabric source is at least one of a carbon fiber spiral manufacturing source or a helical fabric manufacturing source. In various embodiments, the water is fed during the formation of the preform and the water entangles the preform in situ.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, tows and yarns (and their orientations) in practice are very small and closely packed, the figures herein may show exaggerated and/or idealized fiber width and spacing in order to more clearly illustrate the fiber orientations and shape of the bundles.

DETAILED DESCRIPTION

Figure 1:
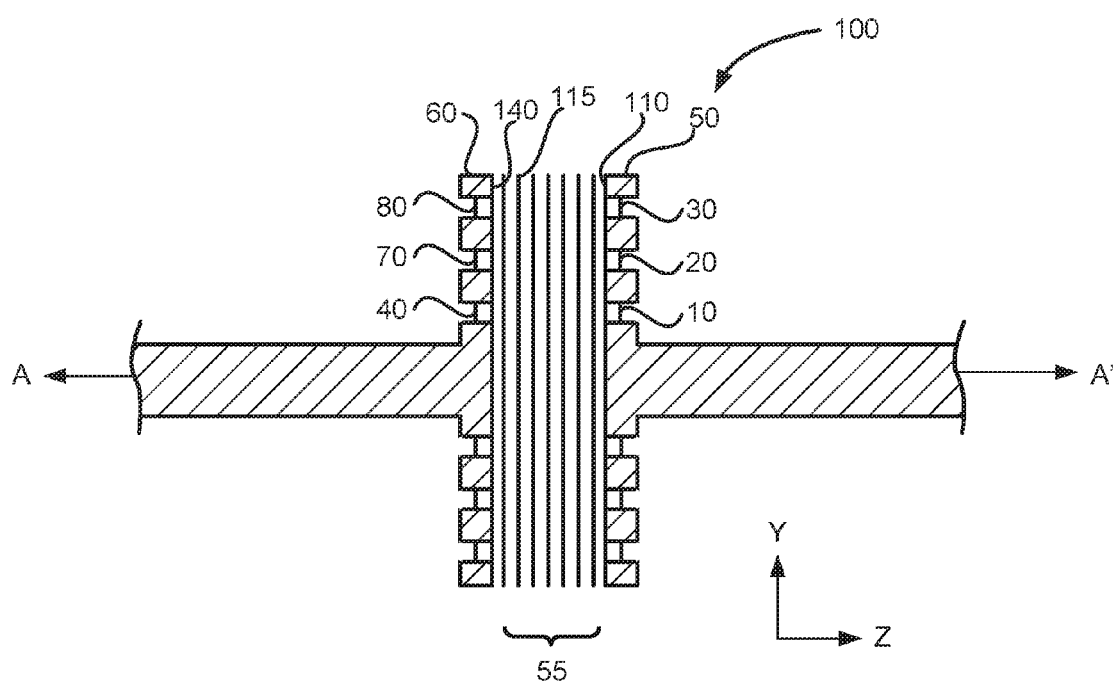
FIG. 1 illustrates a side cross-sectional view of a water-entanglement system according to various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

C/C material is generally formed by utilizing continuous oxidized polyacrylonitrile (PAN) fibers, referred to as "OPF" fibers. Such OPF fibers are the precursors of carbonized PAN fibers and are used to fabricate a preformed shape using a needle punching process. It is common in brake manufacturing to layer OPF fibers in a selected orientation into a preform of a selected geometry. Two or more layers of fibers may be layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

As used herein, the terms "tow" and "cable" are used to refer to one or more strands of substantially continuous filaments. Thus, a "tow" or "cable" may refer to a plurality of strands of substantially continuous filaments or a single strand of substantially continuous filament. "Fiber bundle" may refer to a tow of substantially continuous filaments. "Fiber bundle" may also refer to various formats of narrow strips of stretch broken fibers. "Spiral" fabric may also be referred to herein as "helical" fabric. A "textile" may be referred to as a "fabric" or a "tape." A "loom" may refer to any weaving device, such as a narrow fabric needle loom.

As used herein, the term "ribbon" is used to refer to a closely packed bundle of continuous filaments and discontinuous filaments such as stretch broken fibers generally delivered from a spool. A "span" as used herein may be a length of ribbon and/or tow. As used herein, the term "yarn" is used to refer to a strand of substantially continuous fibers or staple fibers or blends of these, thus the term "yarn" encompasses tow and cable. As used herein, the unit "K" represents "thousand." Thus, a 1K tow means a tow comprising about 1,000 strands of substantially continuous filaments. For example, a "heavy tow" may comprise about 48,000 (48K) or more textile fibers in a single tow, whereas a "medium tow" may comprise about 24,000 (24K) textile fibers within a single tow whereas a "lighter tow" may comprise about 6,000 (6K) or fewer textile fibers within a single tow. Fewer or greater amounts of textile fibers may be used per cable in various embodiments. In various embodiments disclosed herein, fabrics in accordance with various embodiments may comprise tows of from about 0.1K to about 100K, and, in various embodiments, heavier tows. As is understood, "warp" fibers are fibers that lie in the "warp" direction in the textile, i.e., along the length of the textile. "Weft" fibers are fibers that lie in the "weft" direction in the textile, i.e., along the width of the textile. Warp fibers may be described as being spaced apart with respect to the weft direction (i.e., spaced apart between the outer diameter (OD) and inner diameter (ID) of the textile). Similarly, the weft tows may be described as being spaced apart with respect to the warp direction.

As previously mentioned, commercial carbon fiber tows are typically packaged in the form of a flat ribbon onto spools, such as cardboard spools. Annular preforms may be used in aircraft brake needled preforms. Potential feed textiles used in fabrication of annular needled preforms such as continuous helical fabrics are typically fabricated using take-off systems to pull the fabric and tows through the weaving loom. These fabrics, with localized high fiber volume fiber bundles, are often subject to a high level of needling to fabricate a carbon preform with a low fiber volume, such as for the manufacturing of carbon-carbon friction disks. One efficient approach to fabricate an annular needled preform is to directly introduce a portion of or all the fibers in the form of tows fed directly to the needle punching loom. Approaches to directly feed carbon fiber tows into a circular needle punching loom are described in U.S. Pat. No. 7,185,404.

Needling carbon fiber is difficult using standard non-woven needling processes due to the low elongation associated with causing carbon fibers to break, thus potentially causing damage that occurs during needling. Water-jet or water-entanglement may be utilized to create a non-woven carbon fiber preform using carbon fiber as opposed to oxidized PAN. According to various embodiments, water entanglement from multiple surfaces, such as a top surface and a bottom surface of a preform as it accumulates layers in the Z direction, is disclosed herein. In this way, the non-woven preform may maintain a substantially uniform construction and be produced quickly.

According to various embodiments, the proposed method involves feeding two sources of substantially continuous spiral fabric in between a pair of rotating substantially parallel plates. The parallel plates contain holes, such as water jets, from which water may be configured to be fed and imparted onto one or more surface of a preform. This water may be fed during the formation of the preform, such as in concert with carbon fiber spiral fabric entering and being "laid down" in the gap between the parallel plates. In this way, the growing layers of provided spiral fabric may be subsequently substantially and/or continuously entangled using water jets.

According to various embodiments, a reduced manufacturing cycle time may be achieved as compared with physical needle needling processes. A reduction in mechanical damage to the spiral fabric may be achieved as compared to typical non-woven needling processes. Additionally, according to various embodiments, the needling zone may be fed directly from a carbon fiber spiral manufacturing source and/or helical fabric manufacturing source.

According to various embodiments and with reference to FIG. 1, a water-entanglement system 100 is configured to facilitate water-entanglement via water jets, such as water jets 10, 20, and 30 of a first rotating water-entanglement plate 50 and water jets 40, 70, and 80 of a second water-entanglement plate 60, of a preform 115 in multiple directions such as from a top surface and a bottom surface (in the Z direction). In this way, water needling may be performed on a preform 115 as it is expanding in the Z direction as layers are being formed on a top surface (e.g., in situ), such as the surface proximate surface 140 in the negative Z direction and a bottom surface of the preform 115, such as a surface proximate surface 110. The first rotating water-entanglement plate 50 and the second water-entanglement plate 60 may be located in close proximity. The first rotating water-entanglement plate 50 and the second water-entanglement plate 60 may bound gap 55. The first rotating water-entanglement plate 50 and the second water-entanglement plate 60 may be oriented substantially parallel to each other. The first rotating water-entanglement plate 50 and the second water-entanglement plate 60 may be configured to rotate around a common axis, such as axis A-A'. The first water jets 10, 20, and 30 may be oriented towards the second water-entanglement plate 60. The second water jets, 40, 70, and 80 may be oriented towards the second water-entanglement plate 60.

According to various embodiments, layers of preform 115 may be stacked in two directions while needling with water entanglement via water jets 10, 20, 30, 40, 70, and 80. In this way, the thickness (e.g., the distance from a top surface proximate surface 140 to a bottom surface proximate surface 110) of the preform 115 may be increased from both a top surface in the Z direction and a bottom surface in the Z direction with a water jet entangling and/or needling the material at the same time as the layers are being added to the base layer.

Figure 2:
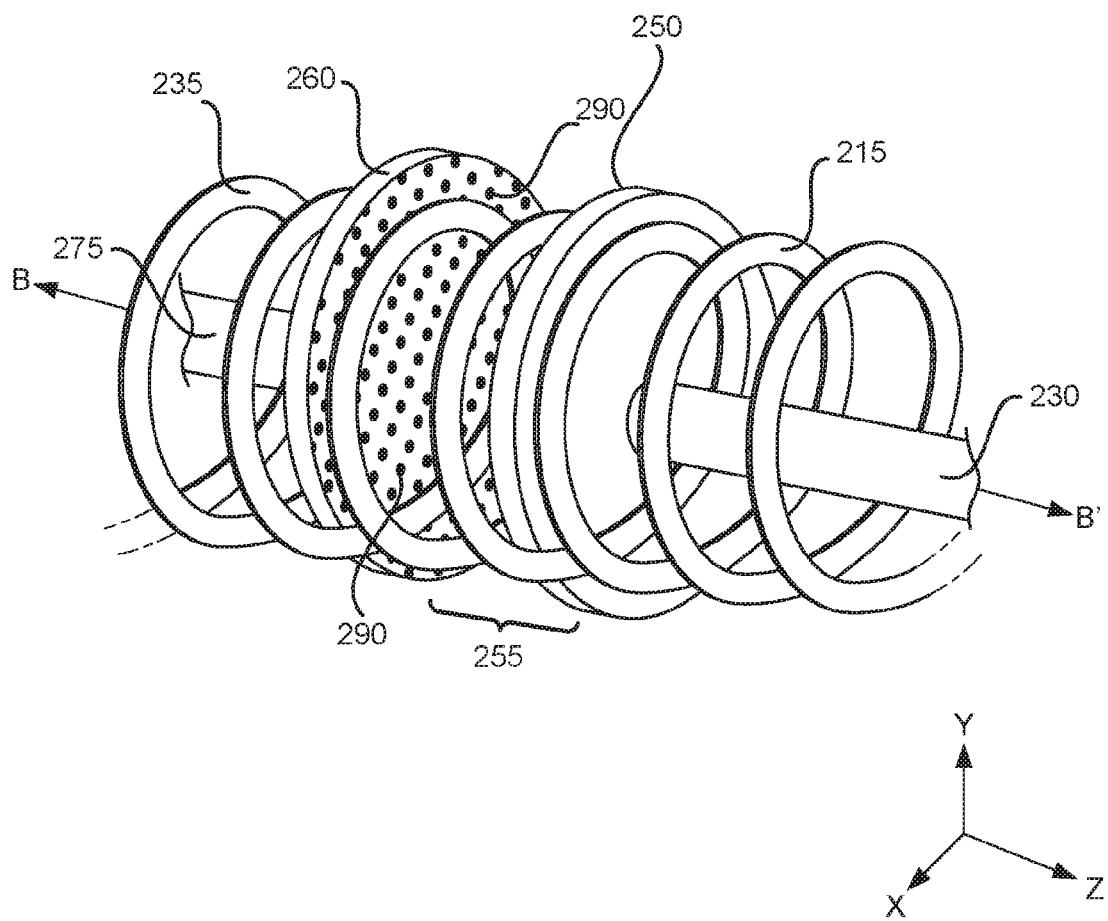
FIG. 2 illustrates an isometric view of a water-entanglement system according to various embodiments.

According to various embodiments and with reference to FIG. 2, a pair of rotatable surfaces may be oriented in close proximity. The first rotatable surface, such as first rotating water-entanglement plate 250, may face the second rotatable surface, such as second rotating water-entanglement plate 260. First rotating water-entanglement plate 250 and second rotating water-entanglement plate 260 may be configured to rotate substantially in unison. A first loose feed 215 of helical fabric may be fed from a spool 230 or directly from a spiral fabric weaving machine (e.g., first fabric source) into the gap 255 bounded by first rotating water-entanglement plate 250 and second rotating water-entanglement plate 260. First loose feed 215 of helical fabric and/or second loose feed 235 of helical fabric may comprise a pre-woven unidirectional helical fabric of any desired length. For example, first loose feed 215 of helical fabric and/or second loose feed 235 may each be half the length associated with a final preform dimension. Stated another way, first loose feed 215 of helical fabric and second loose feed 235 of helical fabric may be combined to form the final preform. A second loose feed 235 of helical fabric may be fed from a spool 275 (e.g., second fabric source) into the gap 255 bounded by first rotating water-entanglement plate 250 and second rotating water-entanglement plate 260.

First rotating water-entanglement plate 250 may be configured to have a plurality of water jets 290 disposed on its surface. The plurality of water jets 290 may be positioned on any desired location of first rotating water-entanglement plate 250 or second rotating water-entanglement plate 260. According to various embodiments, the water jets 290 may be located radially across the face of the first rotating water-entanglement plate 250 and/or second rotating water-entanglement plate 260 to substantially cover the first rotating water-entanglement plate 250 or second rotating water-entanglement plate 260 with between about a 2 to 10 diameter hole distance separating any two adjacent water jets 290, wherein the term "about" in this context only means +/−1 diameter hole. According to various embodiments, the water jets 290 may be located radially across the face of the first rotating water-entanglement plate 250 and/or second rotating water-entanglement plate 260 to substantially cover a subsection of the first rotating water-entanglement plate 250 or second rotating water-entanglement plate 260 with between about a 2 to 10 diameter hole distance separating water jets 290, wherein the term "about" in this context only means +/−1 diameter hole. The subsection may comprise a wedge of the first rotating water-entanglement plate 250 and/or second rotating water-entanglement plate 260 and/or any geometric or non-geometric shape or shapes. Water jets 290 may be disposed in an ordered or random pattern radially across the face of the first rotating water-entanglement plate 250 and/or second rotating water-entanglement plate 260 such that water jets 290, separated by small distances, span from a first outer diameter location across the diameter of the face of the first rotating water-entanglement plate 250 and/or second rotating water-entanglement plate 260 to an opposite second outer diameter location.

According to various embodiments, the first loose feed 215 of helical fabric may be input to the gap 255 between first rotating water-entanglement plate 250 and second rotating water-entanglement plate 260. The first loose feed 215 of helical fabric may be secured to a portion of the first rotating water-entanglement plate 250 or the second rotating water-entanglement plate 260 by any desired attachment mechanism. For instance, the first loose feed 215 of helical fabric may be retained in the gap by guide plates wrapped around the circumference of the water-jet needling plates, and/or motive force supplied by first rotating water-entanglement plate 250 and/or the second rotating water-entanglement plate 260.

According to various embodiments, the first loose feed 215 of helical fabric may be pulled into the gap 255 bounded by the first rotating water-entanglement plate 250 and the second rotating water-entanglement plate 260, such as through a slot, due to friction caused through contact with at least one of first rotating water-entanglement plate 250 and/or the second rotating water-entanglement plate 260. Gap 255 may increase as the layers of the preform increase. In this way, the force of the jets of water and/or surfaces of the first rotating water-entanglement plate 250 and/or the second rotating water-entanglement plate 260 may hold the preform in position while it is being formed and/or water entangled.

According to various embodiments, the second loose feed 235 of helical fabric may be input to the gap 255 between the first rotating water-entanglement plate 250 and the second rotating water-entanglement plate 260. The second loose feed 235 of helical fabric may be secured by any desired attachment mechanism. For instance, the second loose feed 235 of helical fabric may be retained in the gap 255 by guide plates wrapped around the circumference of the water-jet needling plates, and/or motive force supplied by first rotating water-entanglement plate 250 and/or the second rotating water-entanglement plate 260.

According to various embodiments, the second loose feed 235 of helical fabric may be pulled into the gap 255 bounded by first rotating water-entanglement plate 250 and the second rotating water-entanglement plate 260 due to friction caused through contact with at least one of first rotating water-entanglement plate 250 and/or the second rotating water-entanglement plate 260.

The first loose feed 215 of helical fabric and/or second loose feed 235 of helical fabric may form layers of an annular preform formed around axis B-B'. Axis B-B' may be directed in the Z direction. As additional helical fabric is input between the first rotating water-entanglement plate 250 and the second rotating water-entanglement plate 260, such as into gap 255, the annular preform may grow in concentric annular layers in both the positive and negative Z direction. The distance between first rotating water-entanglement plate 250 and the second rotating water-entanglement plate 260 will increase in concert with the additional layers of the annular preform being formed.

According to various embodiments, as additional helical fabric is input between the first rotating water-entanglement plate 250 and the second rotating water-entanglement plate 260 and the annular preform grows in the positive and negative Z directions, water-entanglement via water jets, such as water jets 290, may occur to the top most and/or bottom most layer of the annular preform. Stated another way, the first rotating water-entanglement plate 250 and the second rotating water-entanglement plate 260 may inject a stream of fluid, such as water, into the top and bottom surface, respectively, of the growing annular preform as it is being formed (e.g., growing layer by layer in the positive and negative Z directions). The water jet 290 "needling" may be configured to interconnect the horizontal fibers of layers of the preform with a third direction (the Z direction). As stated above, the fibers extending into the third direction are also called z-fibers. This "needling" process may involve configuring jets of high pressure water to displace a portion of the horizontal fibers of layers of preform into the z-direction and thus interconnect and/or entangle layers of the preform. In various embodiments, the water jets 290 produce a high velocity stream of high pressure water in a range of 0 to 10,000 psi (0 to 68.95 MPa) and, in various embodiments, of 500 psi (3.45 MPa) to 5,000 psi (34.5 MPa). This may result in less mechanical damage to the preform layers as compared with a needling process using barbed needles. Of course, though referred to as a "needling" process, no needles are involved in a water entanglement process.

In response to the preform being fully formed and/or water entangled, the distance between the first rotating water-entanglement plate 250 and the second rotating water-entanglement plate 260 may be increased and the preform may be removed from proximity to first rotating water-entanglement plate 250 and the second rotating water-entanglement plate 260. Excess fabric, either on the outer diameter or inner diameter of the preform, may be removed.

Figure 3:
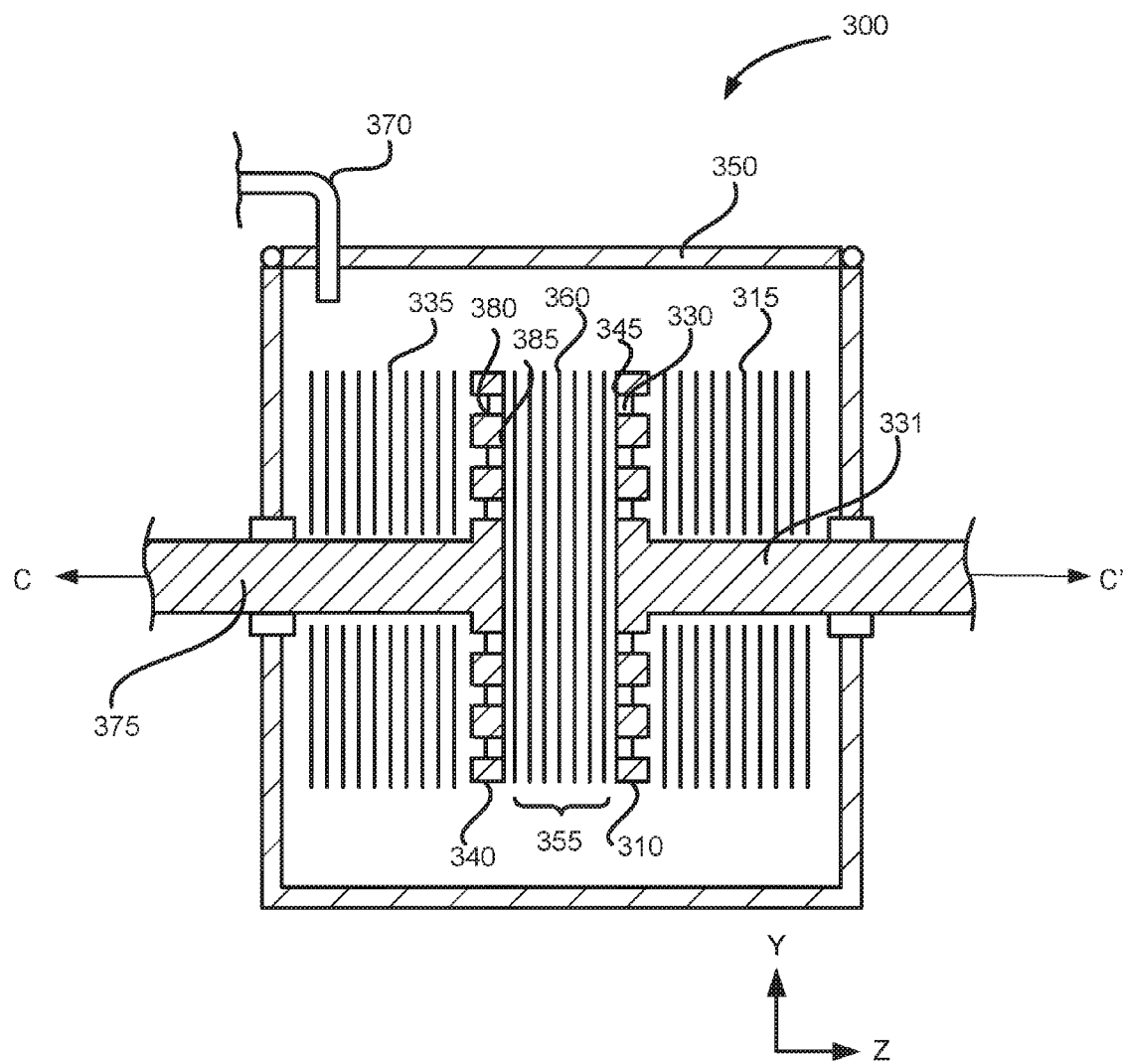
FIG. 3 illustrates a side cross-sectional view of a water-entanglement system having an enclosing housing according to various embodiments.

According to various embodiments and with reference to FIG. 3, a system 300 is configured to facilitate water-entanglement via water jets, such as water jets 330 of a first rotating water-entanglement plate 310 and water jets 380 of a second rotating water-entanglement plate 340, of a growing preform 360 in multiple directions such as from a top surface and a bottom surface (in the Z direction). In this way, needling utilizing jets of water may be performed on a growing preform 360 as it is expanding in the Z direction. The first rotating water-entanglement plate 310 and the second rotating water-entanglement plate 340 may be entirely contained within a housing 350. A first loose feed 315 of helical fabric may be fed from a spool 331 into the gap 355 bounded by first rotating water-entanglement plate 310 and the second rotating water-entanglement plate 340. A second loose feed 335 of helical fabric may be fed from a spool 375 into the gap 355 bounded by first rotating water-entanglement plate 310 and the second rotating water-entanglement plate 340. First loose feed 315 of helical fabric and second loose feed 335 of helical fabric may be contained within housing 350. Various guides and/or chutes may assist with the orientation of first loose feed 315 of helical fabric and/or second loose feed 335 of helical fabric within system 300. In this way, layers of an annular preform may be formed concentrically around axis C-C'. As the preform expands in width in the positive and negative Z directions, water jets 330 and water jets 380 distributed radially on the surface of first rotating water-entanglement plate 310 and the second rotating water-entanglement plate 340, respectively, may be configured to water entangle, and effectively "needle," the layers of the preform. Water jets 330 and water jets 380 may substantially cover the surface 345 of first rotating water-entanglement plate 310 and the surface 385 the second rotating water-entanglement plate 340 with minimal spacing, such as between 2 to 10 water jet diameters, between each water jet 330 and water jet 380.

The housing 350 may limit particulate resultant from a water-entanglement (e.g., needling process using water jets fed from a water source) from undesirable interactions. According to various embodiments, a negative pressure, such as via suction 370, may cause airborne particulate to be removed from within housing 350.

Figure 4:
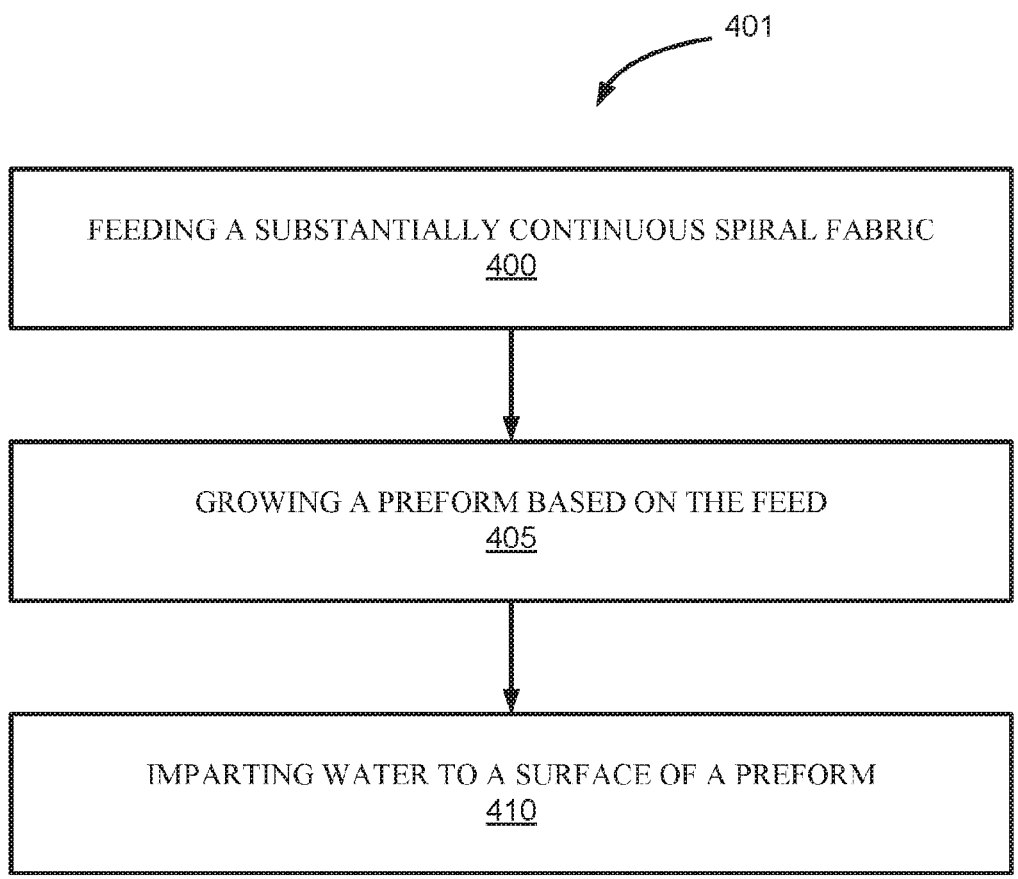
FIG. 4 illustrates a water-entanglement process having an enclosing housing according to various embodiments.

Referring to FIG. 4, a water-entanglement process 401 may be initiated by feeding a substantially continuous spiral fabric (step 400) to a space defined by a first rotatable surface comprising a first water jet and a second rotatable surface comprising a second water jet. In various embodiments, a reduced manufacturing cycle time may be achieved by the growing of a preform based on the feed (step 405) of substantially continuous spiral fabric. Water is imparted to a surface of a preform (step 410) from at least one of the first water jet or the second water jet, wherein the water entangles the preform.

In various embodiments, the water-entanglement process may include receiving the continuous spiral fabric from a first fabric source and a second fabric source. Each of the first and second fabric sources may be a carbon fiber spiral manufacturing source and/or a helical fabric manufacturing source. In various embodiments, the water is fed during the formation of the preform and the water entangles the preform in situ.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A water-entanglement system comprising:
a first rotatable surface, wherein the first rotatable surface comprises a first water jet configured to water entangle a preform in situ; and
a second rotatable surface disposed proximate the first rotatable surface, wherein the second rotatable surface comprises a second water jet configured to water entangle the preform in situ,
wherein the first rotatable surface is oriented substantially parallel to the second rotatable surface, and
wherein the first water jet is oriented towards the second rotatable surface and wherein the second water jet is oriented towards the first rotatable surface, the first rotatable surface and the second rotatable surface bound a gap so that the gap is configured to increase as the preform expands in at least one of a positive Z direction or a negative Z direction.

2. The water-entanglement system of claim 1, wherein the first rotatable surface and the second rotatable surface are configured to rotate about a common axis substantially in unison.

3. The water-entanglement system of claim 1, wherein the preform is an annular preform comprising of a plurality of layers.

4. The water-entanglement system of claim 1, further comprising a first fabric source and a second fabric source.

5. The water-entanglement system of claim 4, wherein a first fabric from the first fabric source and a second fabric from the second fabric source are combined to form the preform.

6. A water-entanglement system comprising:
a housing;
a first rotatable surface disposed within the housing, wherein the first rotatable surface comprises a first water jet configured to water entangle a preform in situ; and
a second rotatable surface disposed within the housing proximate the first rotatable surface,
wherein the second rotatable surface comprises a second water jet configured to water entangle the preform in situ,
wherein the first rotatable surface is oriented substantially parallel to the second rotatable surface, and
wherein the first water jet is oriented towards the second rotatable surface and wherein the second water jet is oriented towards the first rotatable surface, the first rotatable surface and the second rotatable surface bound a gap formed between the first rotatable surface and the second rotatable surface so that the gap is configured to increase as the preform expands in at least one of a positive Z direction or a negative Z direction.

7. The water-entanglement system of claim 6, wherein the first rotatable surface and the second rotatable surface are configured to rotate about a common axis substantially in unison.

8. The water-entanglement system of claim 6, further comprising a first fabric source and a second fabric source, wherein a first fabric from the first fabric source and a second fabric from the second fabric source are combined to form the preform.

* * * * *